United States Patent [19]

Oyamada et al.

[11] 4,108,819

[45] Aug. 22, 1978

[54] PROCESS FOR PRODUCING AN AQUEOUS DISPERSION OF VINYL ACETATE-ETHYLENE COPOLYMER INCLUDING AN EPOXIDE COMPOUND

[75] Inventors: Takeo Oyamada; Shinobu Tsuru; Choji Tomizawa, all of Ichihara; Yoshito Taira, Toyonaka, all of Japan

[73] Assignee: Sumitomo Chemical Company, Limited, Osaka, Japan

[21] Appl. No.: 790,062

[22] Filed: Apr. 22, 1977

Related U.S. Application Data

[63] Continuation-in-part of Ser. No. 648,659, Jan. 13, 1976, abandoned.

[30] Foreign Application Priority Data

Jan. 14, 1975 [JP] Japan .................................. 50-6599
Jul. 16, 1975 [JP] Japan .................................. 50-87528

[51] Int. Cl.$^2$ ...................... C08L 63/10; C08L 31/02
[52] U.S. Cl. ................... 260/29.6 NR; 260/29.6 ME; 260/836; 260/837 R; 156/330
[58] Field of Search .......... 260/29.6 NR, 836, 837 R, 260/29.6 ME

[56] References Cited

U.S. PATENT DOCUMENTS

| | | | |
|---|---|---|---|
| 3,316,195 | 4/1967 | Grosner et al. | 260/29.6 |
| 3,760,031 | 9/1973 | Sato et al. | 260/836 |
| 3,806,483 | 4/1974 | Juba et al. | 260/29.6 NR |
| 3,900,440 | 8/1975 | Ohara et al. | 260/29.7 W |
| 3,905,931 | 9/1975 | Ziegert | 260/29.6 NR |
| 4,028,294 | 6/1977 | Brown et al. | 260/29.6 NR |

*Primary Examiner*—Harold D. Anderson
*Assistant Examiner*—E. A. Nielsen
*Attorney, Agent, or Firm*—Birch, Stewart, Kolasch and Birch

[57] ABSTRACT

A process for producing an aqueous dispersion of vinyl acetate-ethylene copolymer containing an epoxide resin, which comprises emulsion-copolymerizing vinyl acetate, wherein an epoxide resin is dissolved, and ethylene at a pH value of 3 to 7 so that the ratio of vinyl acetate to ethylene is 60–95 : 40–5 by weight and the content of the epoxide resin is 0.5 to 60% by weight on the basis of the total weight of the solid resin components. The aqueous dispersion is useful as a two-pack type adhesive or coating composition in combination with a curing agent.

22 Claims, No Drawings

PROCESS FOR PRODUCING AN AQUEOUS DISPERSION OF VINYL ACETATE-ETHYLENE COPOLYMER INCLUDING AN EPOXIDE COMPOUND

This application is a continuation-in-part application of U.S. Ser. No. 648,659 filed on Jan. 13, 1976, now abandoned.

The present invention relates to a process for producing an aqueous dispersion of vinyl acetate-ethylene copolymer containing an epoxide resin and further two-pack type adhesions or coating compositions comprising said aqueous dispersion of vinyl acetate-ethylene copolymer including an epoxide resin and a curing agent.

Aqueous emulsions of vinyl acetate-ethylene copolymer (hereinafter, referred to as "VAE emulsion") have, hitherto, been widely used as an adhesive for various materials, such as papers, cloths, woods, aluminum or hydrophobic resins (e.g. polyvinyl chloride or polystyrene) because of the wide range of suitabilities thereof as an adhesive, and further have been widely used for adhesives, coating compositions, textile paper coating or the like because the aqueous dispersion of the copolymer shows excellent film-forming properties at a low temperature and the film has excellent water resistance, alkali resistance, heat resistance, softness and weatherability, which properties may widely be varied by controlling the amount of ethylene to be copolymerized, and further the aqueous dispersion has excellent workability since no organic solvent is used.

However, the VAE emulsion does not necessarily satisfy all of the properties required for the various utilities, but has still some defects, for instance, insufficient adhesion in case when it is used as an adhesive of polyolefinic resins, and also inferior stain resistance due to the high stickiness of the coating layer the case where it is used as a coating composition.

In order to eliminate these defects, it has been tried to crosslink the copolymer by adding to the VAE emulsion various crosslinking agents, such as allyl esters of polyfunctional acids (e.g. triallyl cyanurate, diallyl fumarate or diallylmelamine), divinyl ether, diallyl ether, vinyl esters of polybasic acids (e.g. divinyl adipate), or N-methylol compounds (e.g. N-methylolacrylamide or N-methylolmethacrylamide), which may be added during or after the copolymerization reaction of vinyl acetate and ethylene.

This method is effective for improving the properties of the vinyl acetate-ethylene copolymer, such as the mechanical strength and the solvent resistance, but is not effective for improving the adhesion to the polyolefinic resins and the high sticky property of the coating layer thereof and rather decreases occasionally the peculiar characteristics of the VAE emulsion.

Studies have been conducted to find an improved aqueous dispersion of vinyl acetate-ethylene copolymer having excellent properties with no defects as mentioned above. It has now been found that the desired aqueous dispersion of vinyl acetate-ethylene copolymer can be produced by emulsion-copolymerizing vinyl acetate containing an epoxide resin and ethylene so that vinyl acetate and ethylene is contained in a specific ratio and the epoxide resin is contained in a specific range, and that the aqueous dispersion thus obtained is suitable as a coating composition having no tackiness of the coating layer and having an excellent adhesion to the polyolefinic resins, to which the conventional VAE emulsion does not show a sufficient adhesion.

An object of the present invention is to provide a process for producing an improved aqueous dispersion of vinyl acetate-ethylene copolymer containing an epoxide resin.

Another object of the invention is to provide an improved aqueous dispersion of vinyl acetate-ethylene copolymer having excellent properties.

A further object of the invention is to provide two-pack type adhesives comprising the aqueous dispersion of the copolymer and a curing agent.

A still further object of the invention is to provide two-pack type coating compositions comprising the aqueous dispersion of the copolymer and a curing agent.

These and other object of the invention will be apparent from the description hereinafter.

The process of the present invention comprises emulsion-copolymerizing vinyl acetate, containing an epoxide resin dissolved therein, and ethylene at a pH value of 3 to 7 so that the ratio of vinyl acetate to ethylene is 60–95: 40–5 by weight and the content of the epoxide resin is 0.5 to 60% by weight, based on the total weight of the solid resin components.

According to the present invention, the epoxide resin and the vinyl acetate-ethylene copolymer are homogeneously contained within the particles of the aqueous dispersion, and the reaction can proceed without the occurrence of the ring of the epoxide group opening at the specific range of pH value. As the result, a aqueous dispersion thus obtained shows sufficiently excellent properties for the adhesives of polyolefinic resins and for the coating compositions.

The epoxide resin used as a crosslinking agent in the present invention should be dissolved in the vinyl acetate monomer. When the epoxide resin is added to the polymerization system of vinyl acetate-ethylene without dissolving in vinyl acetate, i.e. in the form of an independent emulsion, the particles of the epoxide resin, the particles of the vinyl acetate-ethylene copolymer and the particles of the vinyl acetate-ethylene copolymer containing the epoxide resin are present heterogeneously, and as a result, the crosslinking of the copolymer with the curing agent can not proceed uniformly and therefore the aqueous dispersion shows inferior adhesion and the film made therefrom shows inferior properties.

Also, in case of an aqueous dispersion containing an epoxide resin which is prepared by blending the epoxide resin with the vinyl acetate-ethylene copolymer emulsion after the polymerization reaction thereof, the particles of the epoxide resin and the particles of the vinyl acetate-ethylene copolymer are present heterogeneously, similarly as above and the crosslinking of the copolymer with the curing agent can not uniformly proceed.

The content of the epoxide resin in the aqueous dispersion of the present invention may preferably range from 0.5 to 60% by weight, based on the vinyl acetate-ethylene copolymer. When the content of the epoxide resin is less than 0.5% by weight, the aqueous dispersion does not show the desired properties. On the other hand, when the content is over 60% by weight, the important characteristics of the vinyl acetate-ethylene copolymer, for instance, excellent adhesion to polyvinyl chloride, softness and weatherability, became deteriorated.

The epoxide resins used in the present invention are compounds having at least two epoxide groups per molecule and are soluble in vinyl acetate monomer, and examples thereof are, for instance, bisphenol A-epichlorohydrin type epoxide compounds, polyalkylene ether type epoxide compounds, side chain-containing epoxide compounds, alicyclic epoxide compounds, polyfatty acid ester type epoxide compounds, glyceryltriepoxides, alkylphenol type epoxide compounds, phenolformaldehyde (novolak) type epoxide compounds, or the like. Suitable examples of the epoxide resins are glycidyl epoxide compounds obtained by condensing epichlorohydrin with a phenol compound (e.g. hydroquinone, resorcinol, catechol, phloroglucinol, dihydroxydiphenyl, bisphenol A, bisphenol F, p-hydroxyphenylethane, phenol novolak or cresol novolak); glycidyl epoxide compounds obtained by reacting epichlorohydrin with an aliphatic polyol (e.g. ethylene glycol, butanediol, hexanediol, polypropylene glycol, glycerin, erythrite or 4,4'-dihydroxydicyclohexylpropane); glycidyl ester type epoxide compounds obtained by reacting an aliphatic, alicyclic or aromatic polycarboxylic acid with epichlorohydrin (e.g. diglycidyl adipate, diglycidyl phthalate, diglycidyl isophthalate, diglycidyl terephthalate, diglycidyl hexahydrophthalate or glycidyl p-hydroxybenzoate); alicyclic epoxide compounds (e.g. vinylcyclohexane dioxide, dicyclopentadiene dioxide or bis(3,4-epoxy-6-methylcyclohexyl)adipate); or polyallyl glycidyl ethers obtained by polymerizing allyl glycidyl ether.

The present aqueous dispersion is used in combination with a curing agent. The curing agents are preferably amine compounds. Suitable examples of the curing agent are aliphatic polyamines or adducts thereof (e.g. ethylene diamine, diethylene triamine, triethylene tetramine, tetraethylene pentamine, diethylaminopropylamine, or mono- or di-epoxide adduct thereof); heterocyclic amines or adducts thereof (e.g. N-aminoethylpiperazine); aliphatic polyamines of dimer acids or adducts thereof; polyamides of dimer acids with aliphatic amines; aromatic polyamines or adducts thereof (e.g. m-phenylene diamine, diphenyldiaminomethane, or mono- or di-epoxide adduct thereof); tertiary amines (e.g. benzyldimethylamine); or amine compounds of melamine-formaldehyde precondensate. Polysulfide, phenol-formaldehyde precondensate or the like are also usable.

In the process of the present invention, it is important to maintain the pH value of the emulsion-polymerization system at 3 to 7 in order to inhibit the ring opening of the epoxide group and also to inhibit the hydrolysis of vinyl acetate. For this purpose, an appropriate pH adjustor may be used in an amount required for adjusting the pH value of the system at the desired range. Examples of the pH adjustor are ammonium hydrogen carbonate, sodium hydrogen carbonate, disodium phosphate, sodium acetate, aqueous ammonia, acetic acid, hydrochloric acid, or the like, which may be used alone or in a mixture of two or more kinds thereof.

In practice of the present process, the emulsion-polymerization system is dispersed by using various dispersing agents, i.e. by using various water-soluble high molecular weight compounds as a protective colloid and/or various nonionic or anionic surfactants as an emulsifier. These protective colloids and emulsifier may be used alone or in the combination thereof. Examples of the protective colloids are polyvinyl alcohol, partially hydrolized polyvinyl alcohols, cellulose derivatives (e.g. methyl cellulose or hydroxyethyl cellulose), or the like. When the protective colloid is used alone, i.e. without using any emulsifier, the preferred example of the protective colloid is a partially hydrolyzed polyvinyl alcohol having an average degree of polymerization of 310 to 2,700 and an average degree of hydrolysis of 70 to 97% by mol, which is usually used in an amount of 2 to 6% by weight based on the total weight of the epoxide resin, vinyl acetate and ethylene.

Examples of the nonionic surfactant are polyoxyethylene alkyl ethers (e.g. polyoxyethylene lauryl ether), polyoxyethylene alkylphenol ethers (e.g. polyoxyethylene octylphenol ether or polyoxyethylene nonylphenol ether), polyoxyethylene sorbitan fatty acid esters (e.g. polyoxyethylene sorbitan monolaurate or polyoxyethylene sorbitan monooleate), polyoxyethylene polyoxypropylene block copolymer (ethylene oxide addition amount: 10 to 80% by mol), or the like. Examples of the anionic surfactant are higher alcohol sulfate salts (e.g. sodium laurylsulfate), polyoxyethylene sulfate salts (e.g. sodium polyoxyethylene alkylsulfate or sodium polyoxyethylene alkylphenylsulfate), dialkylsulfosuccinic acid salts (e.g. sodium dialkylsulfosuccinate), alkylbenzenesulfonic acid salts, or the like. These emulsifiers are usually used in an amount of 0.5 to 8% by weight, based on the total weight of the epoxide resin, vinyl acetate and ethylene.

The process of the present invention can be carried out as follows. A dispersion of the dispersing agent (i.e. the protective colloid and/or the emulsifier) and the pH adjustor as mentioned above in water and a whole or a part of vinyl acetate wherein one or more epoxide resins are dissolved, are charged into a reactor, and the mixture is dispersed with agitation, and thereto is injected ethylene. When vinyl acetate is saturated with ethylene, a radical polymerization catalyst and the remaining epoxide resin/vinyl acetate solution (if any) are added to the mixture under a fixed ethylene pressure, and then the mixture is emulsion-polymerized, optionally with the addition of ethylene and the pH adjustor.

The polymerization temperature is usually 30° to 90° C. The polymerization pressure is determined by the desired content of ethylene. When the ethylene content of the desired product is 5 to 40% by weight, a suitable range for the pressure is 3 to 100 kg/cm².

The radical polymerization catalysts usable in the present invention includes all free radical-forming catalysts (e.g. peroxides) which are usually used in the emulsion polymerization. The preferred example of the catalyst is a redox catalyst which is a combination of a reducing agent and an oxidizing agent. Suitable examples of the oxidizing agent are organic peroxides (e.g. hydrogen peroxide, lauryl peroxide or t-butyl hydroperoxide), or inorganic peroxo acids (e.g. ammonium persulfate, potassium persulfate, sodium persulfate or perboric acid). The reducing agent may be any reducing compound, such as bisulfites, sulfoxylates or ferrous salts. The oxidizing agent is usually used in an amount of 0.1 to 2% by weight based on the basis of vinyl acetate, and the reducing agent is usually used in an amount of 25 to 100% by weight, based on the oxidizing agent.

The content of the solid components in the aqueous dispersion may be varied with the amount of the water used therein, but is usually in the range of 40 to 60% by weight.

When the aqueous dispersion of the present invention is used as an adhesive for a decorative plywood consisting of a polyolefinic resin and a plywood, it is particularly preferable to use a partially hydrolyzed polyvinyl alcohol as the main dispersing agent and an epoxide resin having an epoxy equivalent of less than 250. In this case, the aqueous dispersion thus obtained includes 0.5 to less than 5% by weight, preferably 1 to less than 5% by weight, of the epoxide resin and has the same excellent adhesion as that including 5% by weight or more of the epoxide resin.

The present invention is illustrated by the following Examples but is not limited thereto, wherein "part" is part by weight.

EXAMPLE 1

In water (90 parts) are dispersed a partially hydrolyzed polyvinyl alcohol (average degree of polymerization: 500, degree of hydrolysis: 90% by mol, 3.5 parts), a partially hydrolyzed polyvinyl alcohol (average degree of polymerization: 1,700, degree of hydrolysis: 86% by mol, 1.5 parts) and sodium acetate (0.01 part). The dispersion and a solution of epichlorohydrin-bisphenol A polymer (epoxy equivalent: 186, 3 parts) in vinyl acetate monomer (97 parts) are charged into an autoclave. The mixture is dispersed with agitation and heated to 60° C, and thereto is injected ethylene until the pressure becomes 45 kg/cm$^2$.

To the mixture are continuously added a 10% aqueous solution of Rongalit (i.e. formaldehyde sodium sulfoxylate dihydrate) and a 6% aqueous solution of ammonium persulfate which contains 0.5% of sodium acetate to initiate the polymerization reaction. The polymerization system is maintained at a pH value of 5-6. After reacting for 5 hours and checking whether the residual monomer becomes less than 0.5% by weight, the reaction mixture is cooled to finish the polymerization reaction. The aqueous dispersion thus obtained has the solid components of 55% by weight, the particle size of 0.90 $\mu$ and the viscosity of 1,980 cps (BL — 60 rpm, 25° C), and contains 14 ppm of coarse particles which do not pass through a wire mesh of 100 mesh. The content of the epoxide resin in the solid components is 2.5% by weight, and the content of ethylene in the vinyl acetate-ethylene copolymer is 17% by weight.

EXAMPLE 2

The above Example 1 is repeated excepting that the amounts of vinyl acetate monomer and epoxide resin are changed to 94 parts and 6 parts respectively and the ethylene pressure is made 42 kg/cm$^2$. The content of the epoxide resin in the solid components of the aqueous dispersion thus obtained is 4.8% by weight and the content of ethylene included in the vinyl acetate-ethylene copolymer is 17.2% by weight.

EXAMPLE 3

The Example 1 is repeated excepting that a dispersion of a partially hydrolyzed polyvinyl alcohol (average degree of polymerization: 1,700, degree of hydrolysis: 89% by mol, 3.0 parts), polyoxyethylene nonylphenol ether (HLB: 18.5, 1.5 parts) and polyoxyethylene nonylphenol ether (HLB: 14.3, 1.5 parts) in water (90 parts) is used and the amount of vinyl acetate monomer and epoxide resin are 95 parts and 5 parts respectively. The aqueous dispersion thus obtained has the solid components of 56.1% by weight, the particle size of 0.77 $\mu$ and the viscosity of 1,200 cps (BL — 60 rpm, 25° C) and contains 10 ppm of coarse particles which do not pass through a wire mesh of 100 mesh. The content of the epoxide resin in the solid components is 4.1% by weight and the content of ethylene in the vinyl acetate-ethylene copolymer is 17.5% by weight.

EXAMPLE 4

In water (90 parts) are dispersed a partially hydrolyzed polyvinyl alcohol (average degree of polymerization: 500, degree of hydrolysis: 92% by mol, 3.5 parts), a partially hydrolyzed polyvinyl alcohol (average molecular weight: 1,700, degree of hydrolysis: 84% by mol, 1.5 parts) and sodium acetate (0.01 part). The dispersion and a solution of a liquid epoxy resin (epichlorohydrin-bisphenol A polymer, epoxy equivalent: 186, 20 parts) in vinyl acetate monomer (80 parts) are charged into an autoclave. The mixture is heated with agitation to 60° C and thereto is injected ethylene until the pressure becomes 40 kg/cm$^2$.

To the mixture are continuously added a 10% aqueous solution of Rongalit and a 6% aqueous solution of ammonium persulfate which contains 0.5% of sodium acetate to initiate the polymerization reaction. The polymerization system is maintained at a pH value of 5-6. After reacting for 5 hours and checking whether the residual monomer becomes less than 0.5% by weight, the reaction mixture is cooled to finish the polymerization reaction. The aqueous dispersion thus obtained has the solid components of 55.2% by weight, the particle size of 0.8 and the viscosity of 1,860 cps (BL — 60 rpm, 25° C) and contains 16 ppm of the coarse particles which do not pass through a wire mesh of 100 mesh. The content of the epoxide resin in the solid components is 16.4% by weight and the content of ethylene in the vinyl acetate-ethylene copolymer is 16% by weight.

EXAMPLE 5

In water (80 parts) are dispersed hydroxyethyl cellulose (ethylene oxide addition amount: 2.5 by mol, 1.5 parts), polyoxyethylene nonylphenol ether (HLB: 18.5, 2.5 parts), polyoxyethylene nonylphenol ether (HLB: 14.3, 1.0 part) and sodium acetate (0.01 part). The dispersion and 40 parts of a solution of a solid epoxide resin (epichlorohydrin-bisphenol A polymer, epoxy equivalent: 480, 40 parts) in vinyl acetate monomer (60 parts) are charged into an autoclave. The mixture is heated with agitation to 50° C and thereto is injected ethylene until the pressure becomes 50 kg/cm$^2$. Until vinyl acetate is saturated with ethylene, the mixture is continuously agitated under the ethylene pressure of 50 kg/cm$^2$. To the mixture are continuously added a 10% aqueous solution of Rongalit and a 4% aqueous solution of potassium persulfate which contains 0.5% of sodium acetate to initiate the polymerization reaction, and simultaneously is continuously added the remaining epoxide resin/vinyl acetate monomer solution (60 parts) over a period of 4 hours. The polymerization system is maintained at a pH value of 5.5 - 6.5. After reacting for 6 hours and checking whether the residual monomer becomes less than 0.5% by weight, the reaction mixture is cooled to finish the polymerization reaction. The aqueous dispersion thus obtained has the solid components of 54.8% by weight, the particle size of 0.7 $\mu$ and the viscosity of 860 cps (BL — 60 rpm, 25° C) and contains 20 ppm of coarse particles which do not pass through a wire mesh of 100 mesh. The content of the epoxide resin in the solid components is 33% by weight and the content of ethylene in the vinyl acetate-ethylene copolymer is 15% by weight.

EXAMPLE 6

In water (100 parts) are dispersed polyoxyethylene nonylphenol ethers (ethylene oxide addition amount: 20 and 10, 2 parts, respectively) and sodium vinylsulfonate (0.4 part), which is adjusted to a pH value of 5 with hydrochloric acid. The dispersion and 30 parts of a solution of a solid epoxide resin (epichlorohydrin-bisphenol A polymer, epoxy equivalent: 920, 30 parts) in vinyl acetate monomer (70 parts) are charged into an autoclave. The mixture is heated with agitation to 50° C and thereto is injected ethylene until the pressure becomes 60 kg/cm$^2$. When vinyl acetate is saturated with ethylene, to the mixture are continuously added a 10% aqueous solution of Rongalit and a 6% aqueous solution of ammonium persulfate (aqueous ammonia is added) to initiate the polymerization reaction, and simultaneously is continuously added the remaining epoxide resin/vinyl acetate monomer solution (70 parts) over a period of 4 hours. The polymerization system is maintained at a pH value of 6. After reacting for 6 hours and checking whether the residual monomer becomes less than 0.5% by weight, the reaction mixture is cooled to finish the polymerization reaction. The aqueous dispersion thus obtained has the solid components of 55% by weight, the particle size of 0.2 μ and the viscosity of 300 cps (BL — 60 rpm, 25° C) and contains 10 ppm of coarse particles which do not pass through a wire mesh of 100 mesh. The content of the epoxide resin in the solid components is 21.5% by weight and the content of ethylene in the vinyl acetate-ethylene copolymer is 28.5% by weight.

The epoxy equivalent of the solid components in the aqueous dispersions obtained in the above Example 1 to 6 is measured by a hydrochloric acid-dioxane method described in "High Polymer Compounds Analytical Handbook" issued by Asakura Shoten, 4th Edition, Aug. 15, 1970, page 856. As the result, the epoxy equivalent corresponds to that calculated from the charged starting materials, which means that no ring opening of the epoxide resin occurs during the polymerization reaction.

EXAMPLE 7

The aqueous dispersion obtained in Examples 1 to 3 (100 parts) is mixed with xylylene diamine (a curing agent, 5 parts) to give an adhesive composition. Likewise, the aqueous dispersion obtained in Examples 4 to 6 (100 parts) is mixed with benzyldimethylamine (a curing agent, 30 parts) to give an adhesive composition.

These adhesive compositions are each applied to a plywood (JAS, Class 1) in an amount of 150 g/m$^2$, and thereon is laminated a polyolefin sheet (thickness: 70 μ). The resultant is cured at 25° C, at a relative humidity (RH) of 65% and under a pressure of 50 kg/900 cm$^2$ for 20 hours, and after the pressure is reduced to the atomspheric pressure, it is further cured at 25° C and at a relative humidity of 65% for 48 hours to give a decorative laminate.

The adhesion strength between the plywood and the polyolefin sheet of the decorative laminate and the ratio of broken wood are measured. The results are shown in Table 1.

Besides, in the same manner as described above, similar decorative laminate is produced by using a polyvinyl chloride sheet having the same thickness instead of the polyolefin sheet. The test results on this decorative laminate are also shown in Table 1.

REFERENCE EXAMPLE 1

The Example 1 is repeated excepting that the epoxide resin is replaced by vinyl acetate monomer. By using the aqueous dispersion of vinyl acetate-ethylene copolymer thus obtained, a decorative laminate is prepared in the same manner as described in Example 7. On this decorative laminate, the adhesion strength between the plywood and the polyolefin sheet and the ratio of broken wood are measured. The results are shown in Table 1.

REFERENCE EXAMPLE 2

In a similar manner as in Reference Example 1, the polymerization reaction is carried out wherein N-methylolacrylamide is added to the system to give an aqueous dispersion of crosslinked vinyl acetate-ethylene copolymer wherein 10% of N-methylolacrylamide is copolymerized. By using the aqueous dispersion thus obtained, a decorative laminate is prepared in the same manner as described in Example 7. On this decorative laminate, the adhesion strength between the plywood and the polyolefin sheet and the ratio of broken wood are measured. The results are shown in Table 1.

REFERENCE EXAMPLES 3 TO 6

Aqueous dispersions containing an epoxide resin (epichlorohydrin-bisphenol A polymer, epoxy equivalent: 186) in an amount as shown in Table 1 are prepared by adding the epoxide resin to the aqueous dispersion as described in Reference Example 1, wherein water is further added in order to promote the mixing of the epoxide resin and so that the solid components in the aqueous dispersion becomes 55% by weight on the basis of the total weight of the aqueous dispersion after the epoxide resin in admixed.

Each aqueous dispersion containing the epoxide resin (100 parts) is mixed with xylylene diamine (a curing agent, 5 parts) to an adhesive composition. By using these adhesive compositions, a decorative laminate is prepared in the same manner as described in Example 7. The adhesion strength between the plywood and polyolefin sheet of the decorative laminate and the ratio of broken wood are measured. The results are shown in Table 1.

Table 1

| Aqueous dispersion | Epoxide resin in solid component (% by weight) | Polyolefin sheet Adhesion*1 strength (kg/inch) | Polyolefin sheet Ratio of*2 broken wood (%) | Polyvinyl chloride sheet Adhesion*1 strength (kg/inch) | Polyvinyl chloride sheet Ratio of*2 broken wood (%) |
|---|---|---|---|---|---|
| Example 1 | 2.5 | 4.5 | 100 | 4.5 | 100 |
| Example 2 | 4.8 | 4.6 | 100 | 4.6 | 100 |
| Example 3 | 4.1 | 4.6 | 100 | 4.4 | 100 |
| Example 4 | 16.4 | 5.0 | 100 | 4.5 | 100 |
| Example 5 | 33 | 5.0 | 100 | 4.6 | 100 |
| Example 6 | 21.5 | 4.8 | 100 | 4.7 | 100 |
| Reference | | | | | |

Table 1-continued

| Aqueous dispersion | Epoxide resin in solid component (% by weight) | Polyolefin sheet Adhesion*1 strength (kg/inch) | Polyolefin sheet Ratio of*2 broken wood (%) | Polyvinyl chloride sheet Adhesion*1 strength (kg/inch) | Polyvinyl chloride sheet Ratio of*2 broken wood (%) |
|---|---|---|---|---|---|
| Example 1 | 0 | 1.8 | 10 | 4.4 | 100 |
| Reference Example 2 | 0 | 2.2 | 30 | 2.8 | 40 |
| Reference Example 3 | 2.5 | 1.9 | 10 | — | — |
| Reference Example 4 | 5.0 | 2.5 | 20 | — | — |
| Reference Example 5 | 15.0 | 4.0 | 50 | — | — |
| Reference Example 6 | 35.0 | 4.8 | 60 | — | — |

[Note]:
*1)Adhesion strength
The adhesion strength of each test piece obtained by cutting each decolative laminate in a width of one inch is measured by using a friction pull tester (Shimadzu Autograph, made by Shimadzu Seisakusho Ltd.) at friction pull velocity: 100 mm/minute, at frinction pull angle: 180°, at 25° C, and at relative humidity: 65%.
*2)The ratio of broken wood
The ratio of broken wood is calculated by measuring the ratio (to the polyolefin sheet, by area) of the wood piece which is still adhered onto the sheet after pulled in the above friction pull test.

EXAMPLE 8

The aqueous dispersion obtained in Example 1 to 3 (100 parts) is mixed with xylylene diamine (a curing agent, 5 parts) to give a coating composition. Likewise, the aqueous dispersion obtained in Examples 4 to 6 (100 parts) is mixed with benzyldimethylamine (a curing agent, 30 parts) to give a coating composition.

These coating compositions are each applied to a glass plate to form a film having a thickness of 0.2 mm. The film thus obtained has no sticky property and has excellent softness.

What is claimed is:

1. A process for producing an aqueous dispersion of vinyl acetate-ethylene copolymer containing an epoxide resin, which comprises emulsion-polymerizing vinyl acetate, wherein at least one epoxide resin having at least two epoxy groups per molecule is dissolved therein, and ethylene at a pH value of 3 to 7, so that the ratio of vinyl acetate and ethylene is in the range of 60–95: 40–5 by weight and the content of the epoxide resin is in the range of 0.5 to 60% by weight, based on the total weight of the solid resin components.

2. The process according to claim 1, wherein the content of the epoxide resin is in the range of 5 to 60% by weight based on the total weight of the solid resin components.

3. The process according to claim 2, wherein the epoxide resin is a member selected from the group consisting of a bisphenol A-epichlorohydrin epoxide compound, a polyalkylene ether epoxide compound, a side chain-containing epoxide compound, glyceryltriepoxide, an alkylphenol epoxide compound and a phenol-formaldehyde epoxide compound.

4. The process according to claim 3, wherein a single epoxide resin is dissolved in vinyl acetate monomer.

5. The process according to claim 3, wherein a mixture of at least two epoxide resins are dissolved in vinyl acetate monomer.

6. The process for producing an aqueous dispersion of vinyl acetate-ethylene containing an epoxide resin of 0.5 to less than 5% by weight according to claim 1, wherein the vinyl acetate containing the epoxide resin is dispersed with a dispersing agent comprising predominantly a partially hydrolyzed polyvinyl alcohol having an average degree of polymerization of 310 to 2,700 and an average degree of hydrolysis of 70 to 97% by mol and the epoxide resin is the one having an epoxy equivalent of less than 250.

7. The process according to claim 1, wherein the pH value of the polymerization system is adjusted to 3 to 7 with a pH adjustor selected from the group consisting of ammonium hydrogen carbonate, sodium hydrogen carbonate, disodium phosphate, sodium acetate, aqueous ammonia, acetic acid and hydrochloric acid.

8. An aqueous dispersion of vinyl acetate-ethylene copolymer containing an epoxide resin obtained by the process of claim 1.

9. The aqueous dispersion according to claim 8, wherein the content of the epoxide resin is in the range of 5 to 60% by weight.

10. The aqueous dispersion according to claim 8, wherein the epoxide resin has an epoxy equivalent of less than 250, which is contained in the range of 0.5 to less than 5% by weight on the basis of the total weight of the solid resin components.

11. A method for curing the copolymer in the aqueous dispersion of claim 8 with a curing agent.

12. The method according to claim 11, wherein the curing agent is an amine compound.

13. The method according to claim 12, wherein the amine compound is a member selected from the group consisting of an aliphatic polyamine or the mono-or di-epoxide adduct thereof, a heterocyclic amine, an aliphatic polyamine of a dimer acid, a polyamide of a dimer acid with an aliphatic amine, an aromatic polyamine, a tertiary amine, and a melamine-formaldehyde precondensate.

14. A cured product obtained by curing the copolymer in the aqueous dispersion of claim 8 with a curing agent.

15. The cured product according to claim 14, wherein the curing agent is an amine compound.

16. The cured product according to claim 15, wherein the amine compound is a member selected from the group consisting of an aliphatic polyamine or the mono-or di-epoxide adduct thereof, a heterocyclic amine, an aliphatic polyamine of a dimer acid, a polyamide of a dimer acid with an aliphatic amine, an aromatic polyamine, a tertiary amine, and a melamine-formaldehyde precondensate.

17. A two-pack adhesive comprising the aqueous dispersion of vinyl acetate-ethylene copolymer containing an epoxide resin of claim 8 and a curing agent.

18. The two-pack adhesive according to claim 17, wherein the curing agent is an amine compound.

19. The two-pack adhesive according to claim 18, wherein the amine compound is a member selected from the group consisting of an aliphatic polyamine or the mono-or di-epoxide adduct thereof, a heterocyclic amine, an aliphatic polyamine of a dimer acid, a polyamide of a dimer acid with an aliphatic amine, an aromatic polyamine, a tertiary amine, and a melamine-formaldehyde precondensate.

20. A two-pack coating composition comprising the aqueous dispersion of vinyl acetate-ethylene copolymer containing an epoxide resin of claim 8 and a curing agent.

21. The two-pack coating composition according to claim 20, wherein the curing agent is an amine compound.

22. The two-pack coating composition according to claim 21, wherein the amine compound is a member selected from the group consisting of an aliphatic polyamine or the mono-or di-epoxide adduct thereof, a heterocyclic amine, an aliphatic polyamine of a dimer acid, a polyamide of a dimer acid with an aliphatic amine, an aromatic polyamine, a tertiary amine, and a melamine-formaldehyde precondensate.

* * * * *